United States Patent [19]

Nickol

[11] 4,171,040

[45] Oct. 16, 1979

[54] SIDE MOVER WHEEL FOR GRAIN AUGER

[76] Inventor: Geoffrey P. Nickol, P.O. Box 1060, Coaldale, Alberta, Canada, T0K 0L0

[21] Appl. No.: 799,129

[22] Filed: May 20, 1977

[30] Foreign Application Priority Data

May 21, 1976 [CA] Canada .................................. 253127

[51] Int. Cl.² ............................................ B65G 41/00
[52] U.S. Cl. .................................. 198/302; 198/306; 198/320
[58] Field of Search ............... 198/302, 306, 318, 320; 280/43.17, 761, 767; 172/418, 423

[56] References Cited

U.S. PATENT DOCUMENTS

| | | | |
|---|---|---|---|
| 555,331 | 2/1896 | Railsback | 172/418 |
| 2,151,117 | 3/1939 | Kepler | 172/418 |
| 2,533,261 | 12/1950 | Howe | 198/320 |
| 2,630,905 | 3/1953 | Howe | 198/320 |
| 3,112,040 | 11/1963 | Levitt et al. | 280/425 R |
| 3,647,052 | 3/1972 | Edinger | 198/302 |

*Primary Examiner*—James B. Marbert
*Assistant Examiner*—Jeffrey V. Nase
*Attorney, Agent, or Firm*—Wenderoth, Lind & Ponack

[57] ABSTRACT

A side mover wheel for conveyors used during operation of the conveyor so that the conveyor can be moved laterally at the delivery end in a manner independent of the movement of the receiving end. The invention overcomes the problem of re-positioning a receiving vehicle beneath the delivery end of a conveyor as the receiving end of the conveyor sweeps across the face of the supply pile of any particulate material which is to be transferred to the vehicle. The conveyor has a supporting structure for supporting a central portion of the conveyor. The aforementioned wheel is vertically adjustable and is located directly below the central portion. A lowering device is mounted on the supporting structure and is able to lower the wheel to a first position where the wheel engages the ground and to lift the wheel to a second position above the ground. The axis of the wheel is disposed in a vertical plane parallel to the length of the conveyor. When the wheel is in the first position, the weight of the conveyor borne by said supporting structure is supported by the wheel and the horizontal position of the delivery end can be varied by applying a horizontal force to the supporting structure.

13 Claims, 4 Drawing Figures

SIDE MOVER WHEEL FOR GRAIN AUGER

BACKGROUND OF THE INVENTION

The invention relates to a device for the lateral movement of an elongated conveyor, such that the delivery end can easily be moved laterally during operation of the conveyor.

The type of conveyor most suited for this invention is the augering type especially those used for moving grain or other particulate material. When augering grain from a storage bin to a box on the back of a truck, the grain must flow to a relatively central position in the box so that an even load of maximum capacity results. Where no other conveying means are used to supply the grain or other material to the receiving end of the auger, the lower receiving end of the auger is swung from side to side across the space of a grain pile as the grain is cleaned up from the floor of the grain bin. As a result, the delivery end also pivots about the generally centrally located vertical support of the conveyor and thus the grain or other material will be deposited unevenly in the truck's receiving box or it may miss the box altogether. Prior to this invention, the conveyor would have to be shut off and the truck moved over, by driving the truck forward and backing it to such a position as to centre the box under the delivery end of the auger.

Most grain augers are supported in a generally central location so that the receiving and delivery ends of the conveyor pivot about the vertical support. During loading it is necessary to swing the receiving end of the conveyor across the face of the grain pile. However, the resulting motion of the delivery end over the receiving vehicle is undesirable but unavoidable in centrally supported conveyors. This invention provides an additional wheel which allows the conveyor to be moved laterally during the operation of the conveyor and thus the position of the delivery end of the conveyor can easily be corrected during the loading operation. As a result, there is no need to shut down the conveyor or re-position the vehicle to be loaded.

SUMMARY OF THE INVENTION

The invention is a conveying apparatus comprising an elongated conveyor having a receiving end and a delivery end, support means for supporting a central portion of the conveyor located along the length of the said conveyor above the ground, a vertically adjustable wheel located directly below said central portion, and a lowering device mounted on said support means for lowering said wheel to a first position where said wheel engages the ground and for lifting said wheel to a second position above the ground, the axis of said wheel being disposed in a vertical plane parallel to the length of said conveyor wherein, when the wheel is in said first position, the weight of said conveyor borne by said support means is substantially supported by said wheel and the horizontal position of said delivery end relative to the receiving end can be varied by means of said wheel by applying a horizontal force to said support means in a direction perpendicular to the length of said conveyor.

For the purpose of illustration but not of limitation, specific embodiments of the invention are hereinafter described with reference to the accompanying drawings.

DETAILED DESCRIPTION OF PREFERRED EMBODIMENT

Figure 1:
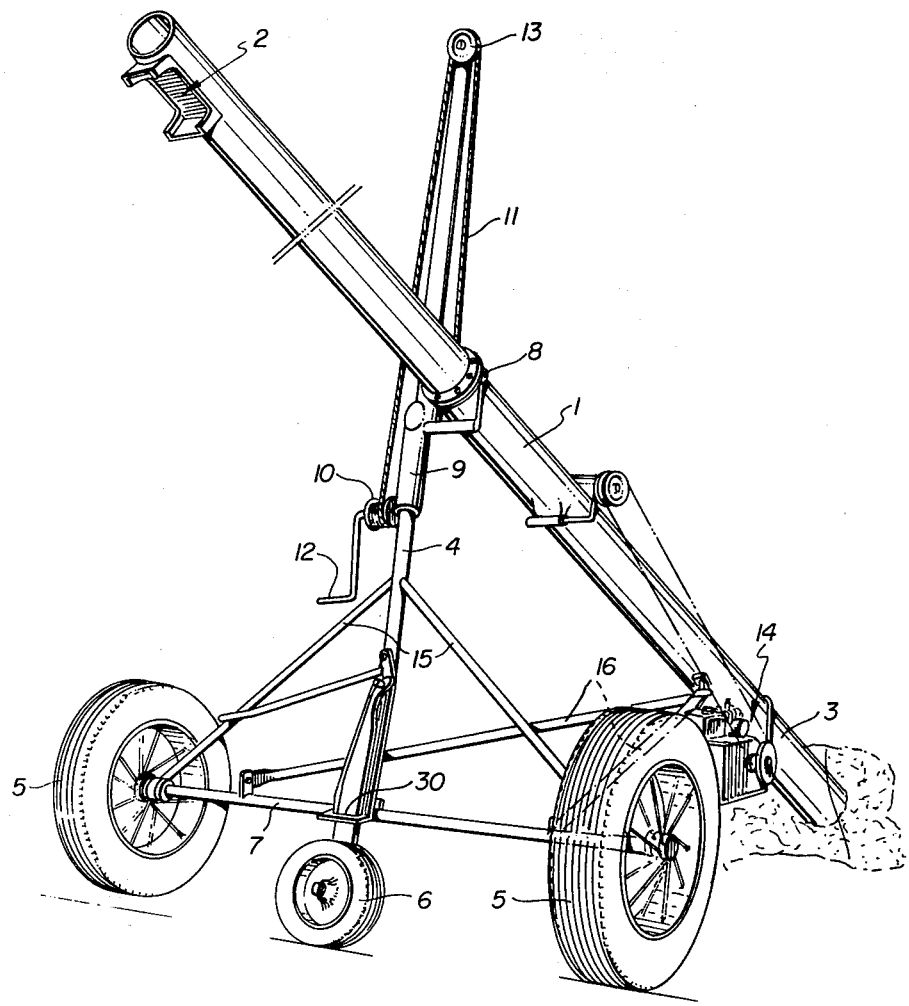
FIG. 1 is a perspective view of a typical conveyor to which the side mover wheel may be attached.

FIG. 1 shows a perspective view of a typical conveying apparatus or grain auger including an elongated conveyor 1 with an elevated delivery end 2 and a receiving end 3 resting on the ground. As in most augers, the height of the receiving end 3 can be varied in known manner by raising or lowering the conveyor bracket 8 through which the elongated conveyor 1 passes. The bracket 8 is fitted with a circular sleeve 9, for instance a pipe, which surrounds the vertical support 4. Attached to the bracket 8 is a chain or cable 11 which runs over a pulley 13 and about a winding reel 10, activated by handle 12, said reel capable of locking at a given position such that said delivery end 2 of the conveyor 1 is held at a desired elevation.

The conveyor includes motor drive means 14, also known, and vertical support bracing 15 and conveyor bracing 16. The conveyor is driven by the drive means 14 via pulleys and drive belts (not shown). The two main wheels 5 are arranged on opposite sides of the conveyor 1, said main wheels 5 being rotatable about a horizontal axis, said axis extending generally perpendicularly to the length of the conveyor 1. Preferably the wheels 5 are located at equal distances from a vertical plane extending through a central longitudinal axis of the conveyor.

Located midway between said main wheels 5 and directly below the central portion of the conveyor is a vertically adjustable wheel 6. The wheel 6 is rotatably connected by an axle 32 to a vertically adjustable arm 23 at the lower end thereof. The vertically adjustable arm 23 slides through slot 30 in guide means 29. The guide means 29 is formed from the lower end of a rigid main body 21 connected to the support 4. The guide means can for instance be made by bending the lower end through 90 degrees and cutting out the slot 30. The vertically adjustable arm 23 has parallel edges 22 in the lower portion, for smooth operation as the lower portion passes through the guide means 29. It will be noted that the axis of wheel 6 at the axle 32 is disposed in a vertical plane parallel to the length of the conveyor. The arm 23 together with the main body 21 form part of a lowering device for lowering or lifting the wheel 6. The guide means 29 guide the vertical movement of the arm 23 and provide horizontal support for the lower portion of the arm.

The main body 21 is connected in any suitable manner to the support means of the conveyor in such a position that when the wheel 6 engages the ground, one of the main wheels 5 is removed from ground engagement. Preferably the wheel 6 and the lowering device are detachably connected to the vertical support 4. The connection means may be by an upper U-bolt clamp 26 and a lower U-bolt clamp 27 both of which embrace the support 4 and are fastened by two nuts 40.

The vertical adjustable arm 23 has a skewed upper end 34 so that the upper portion of said arm 23 provides space for a link 31 and its upper portion is gradually tapered towards the end 34. The link 31 is rigidly attached to one end of a lever arm 20 which is manually operated. The upper end of the vertically adjustable arm 23 is pivotally connected to one end of the link by bolt 24. The upper end of the main body is attached to the other end of the link 31 by bolt 25. The bolt 25 forms a dead centre pivot member about which the link pivots. The wheel 6 is moved to a raised or lowered position by rotating the lever arm 20. The side mover wheel is held in the lowered position by stop member 28 attached to the main body 21 as explained hereinafter. The link 31 and lever arm 20 together form mechanical means for moving the arm 23 from a primary position where the wheel 6 engages the ground to a secondary position.

In operation, the wheel 6 is in a first position when said wheel 6 engages the ground and the weight of the conveyor borne by the support 4 is substantially removed from the main wheels 5 such that at least one of the main wheels 5 is lifted from ground engagement and the two wheels 5 are substantially balanced about the wheel 6. The weight of the conveyor borne by the support 4 is thus substantially supported by the wheel 6. When the wheel 6 is in this first position, the lateral position of the delivery end 2 can be varied relative to the receiving end 3, by applying a horizontal force to the conveyor support means in a direction perpendicular to the length of the conveyor. At the same time it may also be necessary to apply a slight upward force to the one wheel 5 that rests on the ground so that this wheel will not hinder sideways movement. As a result, the delivery end 2 pivots about the receiving end 3 of the conveyor. Thus the delivery end 2 may be positioned centrally over the box of a truck for any given position of the receiving end 3 of the conveyor.

The wheel 6 can be raised to a second position where the wheel 6 is held above and out of contact with the ground. In the second position the weight of the conveyor is supported by the main wheels 5 and the conveyor can be moved in a direction parallel to the longitudinal axis of the conveyor.

In moving the wheel 6 from said second to said first position the lever arm 20, rigidly fastened to link 31, is rotated in a counterclockwise manner about bolt 25, which fastens said link 31 to the main body 21. Since the skewed upper portion 34 of the vertically adjustable arm 23 is connected to the other end of the link 31 by the bolt 24, the vertically adjustable arm 23 slides downwards in guide 29, thus lowering the wheel 6.

In the second position, the bolt 24, which connects the skewed upper portion 34 of the vertically adjustable arm 23 to the link 31, is located in such a position that the vertical centre line "a" through bolt 24 is to the right (in FIG. 2) of the dead centre position formed at the vertical centre line "b" of bolt 25. The upper portion 34 of the arm 23 causes the downward force of the weight of gravity acting on the wheel 6 and the arm 23 to be directed along line "a" with the bolt 25 providing the upward reaction against the upper portion 34. Since further clockwise rotation of the arm 20 is prevented by the bolt 25, the wheel 6 remains in the upper position and the lever arm 20 remains in a position to the right as shown in FIG. 2.

Figure 3:
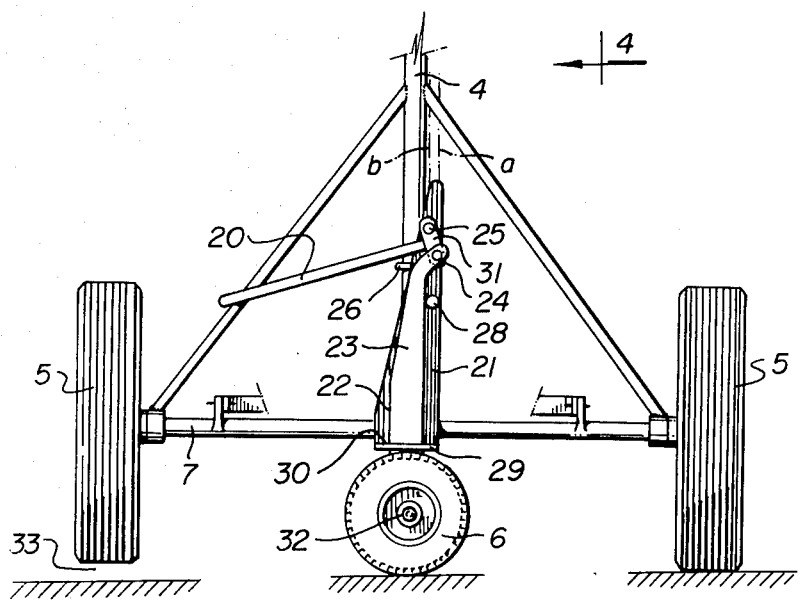
FIG. 3 is the same view as in FIG. 2 except the side mover wheel is in the lowered position so that the conveyor is supported by the side mover wheel.
Figure 4:
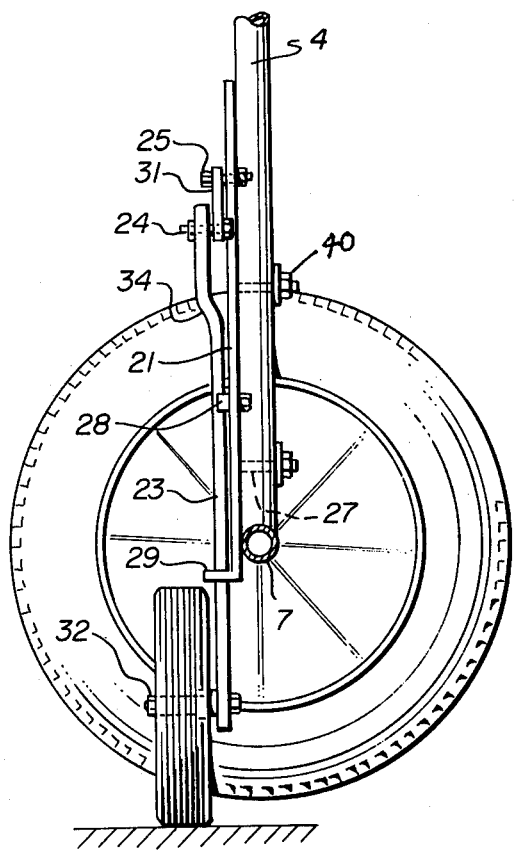
FIG. 4 is a sectional side view of the side mover wheel taken along line IV—IV of FIG. 3 and showing the connection to a vertical support of the conveyor.

In FIG. 3, the lever arm 20 and the link 31 have been pivoted in a counterclockwise manner about the bolt 25 and the side mover wheel is in a lower position supporting the weight of the conveyor such that a main wheel 5 is lifted from ground engagement at 33. In this Figure the lever arm 20 is now to the left of the center of the conveyor. The weight of the conveyor causes the vertically adjustable arm to bear a compressive stress which acts in an upward manner. This force tends to cause the link 31 and the lever arm 20 to rotate further in the counterclockwise manner (after the centre line "a" of bolt 24 has moved beyond and to the right of centre line "b"). This further rotation is prevented by the engagement of the vertically adjustable arm 23 (see FIG. 3) with stop 28 on the main body 21. Thus the vertically adjustable arm 23 is held in the lower position and supports the weight of the conveyor. Since the conveyor is not perfectly balanced, it will tip towards one side or the other as in FIG. 3. In this first position delivery end 2 of the conveyor may be moved in a lateral manner.

Figure 2:
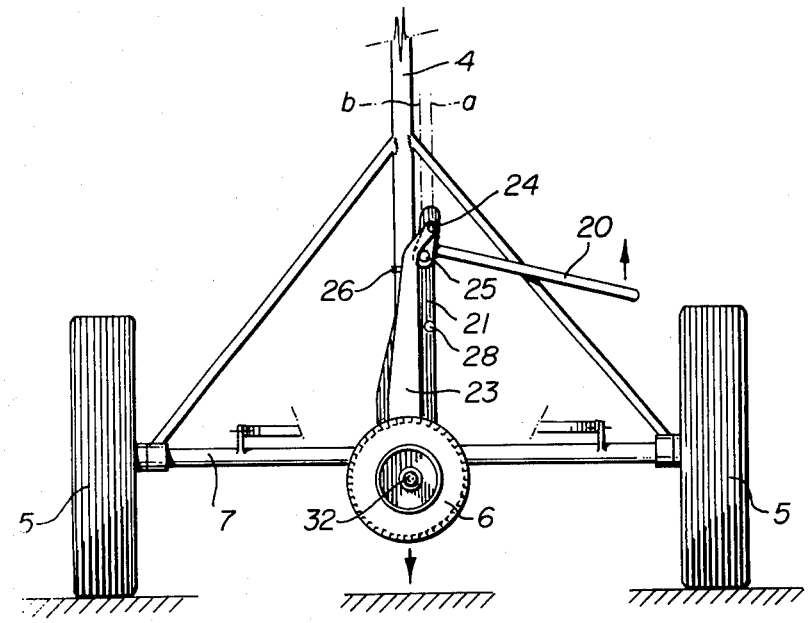
FIG. 2 is a front view of a conveyor showing the support means and side mover wheel in the raised position so that the conveyor is supported by the main wheels.

In one embodiment when the wheel 6 is in the raised position as shown in FIG. 2, the bolt 24 comes to rest immediately above the bolt or pivot member 25. In this case the weight of the lever 20 is sufficient to prevent any possibility of the link 31 accidentally rotating counterclockwise under the influence of the combined weight of the wheel 6 and the arm 23 acting on the bolt 24.

What I claim as my invention is:

1. A conveying apparatus comprising an elongated conveyor having a receiving end and a delivery end, support means for supporting a central portion of the conveyor located along the length of said conveyor above the ground, a vertically adjustable, non-driven wheel located directly below said central portion, and a hand-operated lowering device mounted on said support means for lowering said wheel to a first position where said wheel engages the ground and for lifting said wheel to a second position above the ground, the axis of said wheel being disposed in a vertical plane parallel to the length of said conveyor wherein, when said wheel is in said first position, the weight of said conveyor borne by said support means is substantially supported by said wheel and the horizontal position of said delivery end relative to the receiving end can be varied by means of said wheel by applying a horizontal force to said support means in a direction perpendicular to the length of said conveyor.

2. A conveying apparatus according to claim 1 wherein said support means includes two main wheels arranged on opposite sides of said conveyor, said main wheels being rotatable about a horizontal axis extending perpendicularly to the length of said conveyor.

3. A conveying apparatus according to claim 2 wherein said vertically adjustable wheel is disposed between said main wheels.

4. A conveying apparatus according to claim 1 wherein said lowering device comprises a main body connected to said support means, a vertically adjustable arm connected to said main body and having said vertically adjustable wheel rotatably mounted thereon, guide means on said main body to guide vertical movement of said arm and to provide horizontal support for a lower portion of said arm, and hand-operated mechanical means for moving said arm from a primary position where the wheel is in said first position to a secondary position where said wheel is in said second position.

5. A conveying apparatus comprising an elongated conveyor having a receiving end and a delivery end, support means for supporting a central portion of the conveyor located along the length of said conveyor above the ground, a vertically adjustable wheel located directly below said central portion, and a lowering device mounted on said support means for lowering said wheel to a first position where said wheel engages the ground and for lifting said wheel to a second position above the ground, the axis of said wheel being disposed in a vertical plane parallel to the length of said conveyor wherein, when said wheel is in said first position, the weight of said conveyor borne by said support means is substantially supported by said wheel and the horizontal position of said delivery end relative to the receiving end can be varied by means of said wheel by applying a horizontal force to said support means in a direction perpendicular to the length of said conveyor, and wherein said lowering device comprises a main body connected to said support means, a vertically adjustable arm connected to said main body and having said vertically adjustable wheel rotatably mounted thereon, guide means on said main body to guide vertical movement of said arm and to provide horizontal support for a lower portion of said arm, a link pivotally connected at one end to an upper portion of said arm and at the other end to said main body, a lever rigidly connected at one end to said link, and a stop member to limit movement of said arm when said arm is moved past a dead center position with said lever and said link wherein said vertically adjustable wheel is movable from said second position to said first position by pivoting said lever and is held in said first position by said stop member.

6. A conveying apparatus according to claim 5 wherein said conveyor extends at an angle to the ground, said delivery end being elevated above the ground and said receiving end being at ground level.

7. A conveying apparatus according to claim 6 wherein said receiving end rests on the ground and said conveyor is adapted to convey particulate material.

8. A conveying apparatus according to claim 7 wherein said main wheels are located at equal distances from a vertical plane extending through a central longitudinal axis of said conveyor and said vertically adjustable wheel is disposed midway between said main wheels.

9. A conveying apparatus according to claim 5 wherein said wheel and lowering device are detachably connected to said support means.

10. A conveying apparatus comprising an elongated conveyor having a receiving end and a delivery end, support means for supporting a central portion of the conveyor located along the length of said conveyor above the ground, a vertically adjustable wheel located directly below said central portion, and a lowering device mounted on said support means for lowering said wheel to a first position where said wheel engages the ground and for lifting said wheel to a second position above the ground, the axis of said wheel being disposed in a vertical plane parallel to the length of said conveyor wherein, when said wheel is in said first position, the weight of said conveyor borne by said support means is substantially supported by said wheel and the horizontal position of said delivery end relative to the receiving end can be varied by means of said wheel by applying a horizontal force to said support means in a direction perpendicular to the length of said conveyor, and wherein said lowering device includes a vertically adjustable arm having said wheel rotatably mounted thereto, guide means to guide vertical movement of a lower portion of said arm, a link pivotally connected to one end to an upper portion of said arm and at the other end to a dead centre pivot member, and means for pivoting said link to a position above and below said pivot member.

11. A conveying apparatus according to claim 10 wherein said lowering device includes a stop member to limit movement of said arm when said link is moved to a position below said pivot member, said stop member being located between said guide means and said pivot member.

12. A conveying apparatus according to claim 10 wherein said guide means comprises a slot formed in a rigid main body of said lowering device and said pivot member is mounted on said main body.

13. A conveying apparatus according to claim 12 wherein said pivoting means comprises a manually operated lever rigidly connected at one end to said link.

* * * * *